United States Patent [19]

Nakahama et al.

[11] Patent Number: 4,795,001
[45] Date of Patent: Jan. 3, 1989

[54] TWO-CYCLE FUEL-INJECTION ENGINE

[75] Inventors: Ryoji Nakahama; Tatsuki Uchida, both of Hamamatsu, Japan

[73] Assignee: Sanshin Kogyo Kabushiki Kaisha, Hamamatsu, Japan

[21] Appl. No.: 178,877

[22] Filed: Mar. 31, 1988

Related U.S. Application Data

[63] Continuation of Ser. No. 008,562, Jan. 29, 1987, abandoned.

[30] Foreign Application Priority Data

Feb. 14, 1986 [JP] Japan .................. 61-28976

[51] Int. Cl.$^4$ ............................................ F01M 9/06
[52] U.S. Cl. ................... 184/6.18; 184/6.28; 184/11.2
[58] Field of Search ............ 184/6.18, 6.28, 6.12, 184/11.1, 11.2, 13.1; 123/196 X

[56] References Cited

U.S. PATENT DOCUMENTS

| | | | |
|---|---|---|---|
| 1,271,140 | 7/1918 | Dickey | 123/196 R |
| 1,565,103 | 12/1925 | Randles | 184/11.1 |
| 1,608,413 | 11/1926 | Mortensen | 184/11.1 |
| 2,549,477 | 4/1951 | Kiekhaefer | 184/6.18 |
| 2,617,497 | 11/1952 | Zingg | 184/13.1 |
| 3,857,378 | 12/1974 | Nakamura | 184/6.28 X |
| 4,031,877 | 6/1977 | Fujikawa | 123/196 R |
| 4,068,740 | 1/1978 | Quinn | 184/11.1 |
| 4,222,283 | 9/1980 | Nagy | 184/11.2 |
| 4,295,807 | 10/1981 | Kruger | 123/196 R |
| 4,309,916 | 1/1982 | Ohkuma | 184/11.2 |
| 4,346,680 | 8/1982 | Boychuk | 123/196 R |
| 4,414,929 | 11/1983 | Sakurai | 123/196 R |
| 4,436,067 | 3/1984 | Fritzenwenger | 123/196 R |
| 4,475,488 | 10/1984 | Odashima | 184/6.18 X |
| 4,493,661 | 1/1985 | Iwai | 123/196 R |
| 4,501,237 | 2/1985 | Pitozzl | 184/6.28 |
| 4,523,556 | 6/1985 | Suzuki | 184/6.18 |

FOREIGN PATENT DOCUMENTS

311277  1/1930  United Kingdom ............... 184/11.2

*Primary Examiner*—Leonard E. Smith
*Attorney, Agent, or Firm*—Ernest A. Beutler

[57] ABSTRACT

Several embodiments of outboard motors having fuel injected internal combustion engines. In each embodiment, the fuel injection pump has its drive shaft disposed externally of the engine. The shaft is lubricant pressurized by driving gears within a transfer drive housing.

14 Claims, 6 Drawing Sheets

TWO-CYCLE FUEL-INJECTION ENGINE

This is a continuation of U.S. patent application Ser. No. 008,562, filed Jan. 29, 1987, now abandoned.

BACKGROUND OF THE INVENTION

This invention relates to a two-cycle fuel injection engine and more particularly to an improved arrangement for driving an engine accessory and for lubricating the drive shaft of that accessory.

In many instances, certain auxiliaries or accessories for an internal combustion engine are driven by a drive shaft that is positioned externally of the engine. In this case, these externally positioned drive shafts are remotely positioned from the lubricating system of the engine and thus are not lubricated by the normal lubricating system of the engine. This is particularly true with respect to two-cycle internal combustion engines wherein the engine itself may be lubricted through mixture of lubricant with its fuel or with its intake charge. When a remotely positioned accessory is driven by a remotely positioned drive shaft, that drive shaft will not be lubricated by the engine lubricating system.

It is, therefore, a principal object of this invention to provide an improved arrangement for driving an engine accessory and for lubricating a drive shaft of that accessory.

It is a further object of this invention to provide an accessory drive for an internal combustion engine wherein an externally positioned shaft is provided with its own lubricating system.

One form of accessory which is normally externally positioned from an engine and driven from an external drive shaft is a fuel injection pump. With both diesel and gasolne fuel injected engines, the fuel injection pump is normally positioned externally of the engine and is driven by an external drive shaft. As such, the drive shaft cannot be lubricated conveniently from the engine lubricating system.

It is, therefore, a still further object of this invention to provide an improved driving and lubricating arrangement for the fuel injection pump of an internal combustion engine.

In some instances, it has been proposed to employ a pair of intermeshing gears as an arrangement for pumping lubricant for lubricating as associated shaft. Although such arrangements have advantages, the previously proposed arrangements have employed bevel gears for this purpose. However, a bevel gear drive does not provide as adequate a source of lubrication under pressure as other types of gears.

It is, therefore, a further object of this invention to provide an improved arrangement for employing intermeshing gears as a source for pumping lubricant as well as for establishing a driving relationship between a pair of shafts.

In many instances, a given shaft is called upon to drive a plurality of accessories at different speed ratios. For example, in an internal combustion engine of the two-cycle type as aforedescribed, the same shaft may be employed for driving both a fuel injection pump and a lubricant pump. However, the driving ratios between the shaft and the two pumps can be considerably different. Of course it is desirable to lubricate the gears and the shafts and it is, therefore, a further object of this invention to provide an improved arrangement for driving a plurality of accessories and lubricating the driving shaft for the accessories.

SUMMARY OF THE INVENTION

A first feature of the invention is adapted to be embodied in a lubricating arrangement for a shaft that is journaled within a housing externally of an internal combustion engine that drives the shaft. A first gear is fixed for rotation with the shaft and meshes with a second gear for establishing a driving relationship between the shaft and the second gear. A cavity is defined in the housing and surrounds the gears and is adapted to contain a lubricant. A lubricant passage has an inlet opening disposed to receive lubricant forced by the rotation of one of the gears and for directing that lubricant to the shaft for lubricating the shaft.

Another feature of the invention is adapted to be embodied in a lubricating system for a shaft that is journaled within a housing. A first gear is affixed to the shaft and meshes with a second gear for establishing a driving relationship between the second gear and the shaft. A third gear is affixed for rotation with the shaft and is spaced from the first gear. A fourth gear meshes with the third gear for establishing a driving relationship between the fourth gear and the shaft. A cavity is defined within the housing and surrounds the first and second gears and is adapted to contain a lubricant. A lubricant passage has an inlet opening disposed to receive lubricant thrown by the rotation of one of the first and second gears for directing lubricant to the shaft for lubricating the shaft.

DETAILED DESCRIPTION OF THE PREFERRED EMBODIMENTS

Referring first to the embodiment of FIGS. 1 through 7, an outboard motor constructed in accordance with this embodiment is identified generally by the reference numeral 21. The invention is described in conjunction with an outboard motor since the internal combustion engines of outboard motors normally have accessories such as fuel injection pumps driven by external shafts and thus present certain of the problems described in the section under the heading "Background Of The Invention". It is to be understood, however, that certain features of the invention may be utilized with applications other than outboard motors.

Figure 1:
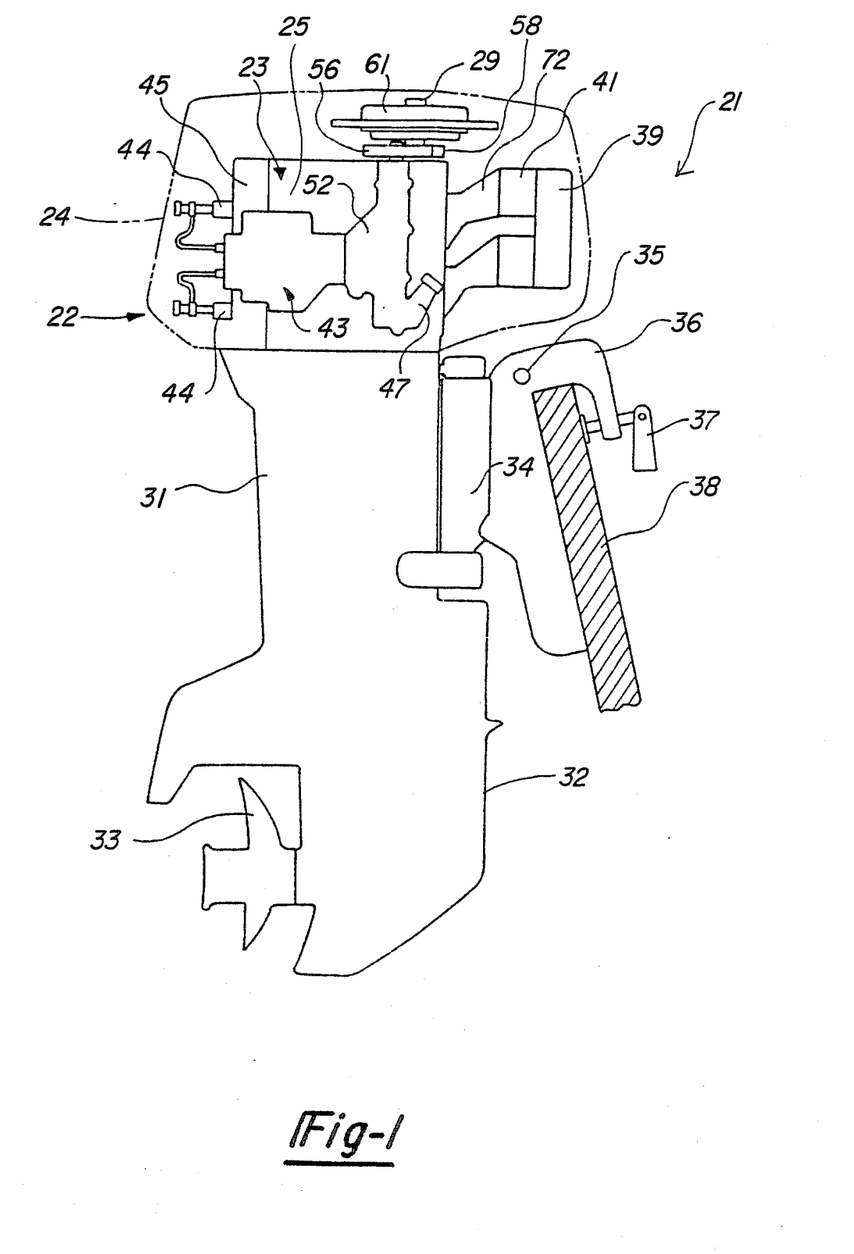
FIG. 1 is a side elevational view of an outboard motor constructed in accordance with a first embodiment of the invention, with portions shown in phantom and other portions shown in cross-section.

The outboard motor 21 includes a power head, indicated generally by the reference numeral 22, and which is comprised of an internal combustion engine 23 and a surrounding protective cowling, shown in phantom and identified by the reference numeral 24. In the illustrated embodiment, the engine 23 is of the two cylinder, inline, crankcase compression diesel type. It is to be understood, however, that the invention may be utilized in conjunction with engines having other numbers of cylinders and engines other than those operating on the diesel principle. However, certain facets of the invention have particular utility in connection with inline type of engines and/or diesel type of engines.

The engine 23 includes a cylinder block 25 in which cylinder bores 26 (FIG. 3) are formed. Pistons 27 reciprocate within the cylinder bores 26 and are connected by means of connecting rods 28 to a crankshaft 29 which, as aforenoted, rotates about a vertically extending axis.

The crankshaft 29 is rotatably coupled in a known manner to a drive shaft (not shown) that is journaled within a drive shaft housing 31. A lower unit 32 is attached to the lower end of the drive shaft housing 31 and journals a propeller shaft (not shown) that is driven by the drive shaft through a forward, neutral, reverse transmission of a known type for driving a propeller 33.

A steering shaft (not shown) is fixed to the drive shaft housing 31 and is journaled within a swivel bracket 34 for steering movement of the outboard motor 21 about a vertically extending steering axis defined by the steering shaft. The swivel bracket 34 is, in turn, pivotally connected by means of a pivot pin 35 to a clamping bracket 36. As a result of this pivotal connection, the outboard motor 21 may be tilted relative to the clamping bracket 36 for either trim adjustment or to permit the outboard motor 21 to be tilted up to an elevated, out of the water position. The clamping bracket 36 includes clamping means 37 for attachment to a transom 38 of an associated watercraft.

The construction of the outboard motor 21 as thus far described may be considered to be conventional. Since the invention relates to a drive arrangement of a fuel injection system for the engine 23, rather than any specific detail of the outboard motor 21, further description of those components of the outboard motor 21 which have no bearing on the invention is believed to be unnecessary.

Figure 2:
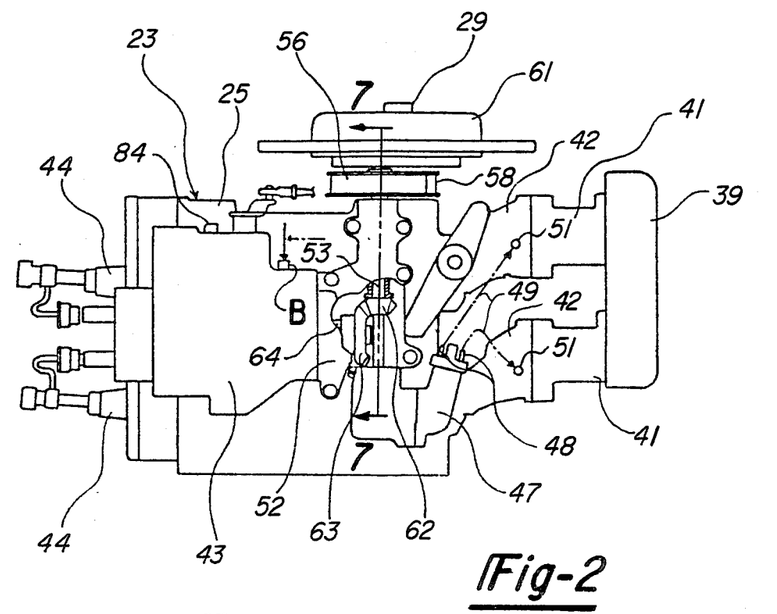
FIG. 2 is an enlarged side elevational view of the engine of the outboard motor, with a portion broken away.
Figures 3, 6:
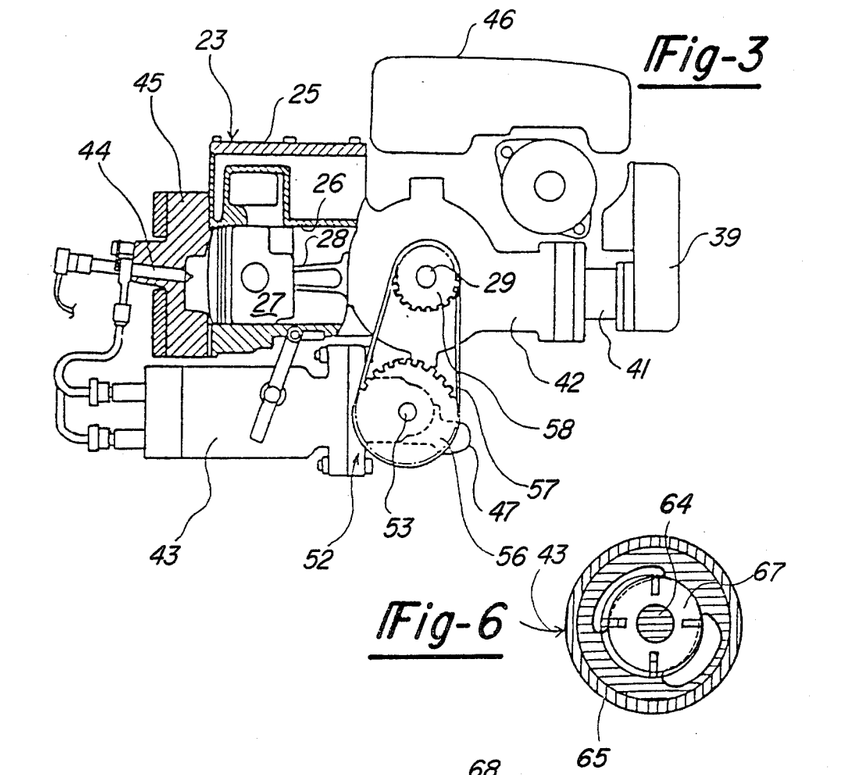
FIG. 3 is a top plan view of the engine with further portions broken way.
FIG. 6 is a cross-sectional view taken along the line 6—6 of FIG. 5.
Figure 4:
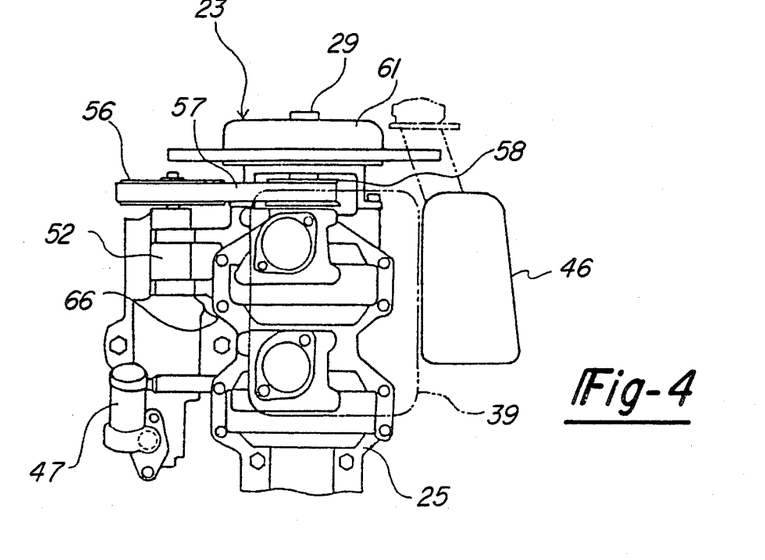
FIG. 4 is an end elevational view looking in the direction of the arrow 4 in FIG. 3, with the air silencer removed.

Referring now primarily to FIGS. 2 through 4, the engine 23 is provided with an air induction system including an air silencer 39 which draws intake air from within the protective cowling 24. The air is admitted to the interior of the protective cowling 24 through any known form of atmospheric air inlet. A pair of throttle bodies 41 in which throttle valves (not shown) are journaled receive air from the air silencer 39 and delivers this air to individual sealed crankcase chambers of the engine 23 through respective intake manifolds 42. Reed by type check valves (not shown) may be positioned in the manifolds 42 so as to prevent reverse flow through them and through the throttle bodies 41.

The engine 23 is provided with a fuel injection system including an injection pump, indicated generally by the reference numeral 43. The fuel injection pump 43 delivers fuel to injection nozzles 44 that are supported within a cylinder head 45 that is affixed in a known manner to the cylinder block 25 for closing the cylinder bores 26. The injection pump 43 is designed so as to deliver high pressure fuel to the nozzles 44 in an amount and at a timing so as to initiate combustion in the combustion chamber.

The engine 23 is also provided with a positive lubricating system that includes a lubricant tank 46 that is contained within the protective cowling 24 and which is designed so as to contain or hold a predetermined quantity of lubricant. Lubricant is transferred from the tank 46 to a lubricant pump 47 through a suitable conduit (not shown). The lubricant pump 47 delivers lubricant to the components of the engine to be lubricated. For example, the lubricant pump 47 may include a pair of discharge outlets 48 that discharge to the intake manifolds 42 through conduits 49 and nozzles 51. Alternatively, lubricant may be delivered directly to certain of the components of the engine to be lubricated or the engine may be lubricated through a combination of these systems.

In accordance with the invention, an arrangement is provided for driving the fuel injection pump 43 and lubricant pump 47 which includes a transfer drive 52. As may be best seen from FIG. 7, the transfer drive 52 includes a drive shaft 53 that is journaled in a transfer drive housing 54 by means of spaced apart bearings 55. A pulley 56 is carried at the exposed upper end of the transfer drive shaft 53 and is driven by means of a belt 57 from a pulley 58 that is affixed to the engine output shaft 29 immediately adjacent its flywheel magneto 61.

Figure 7:
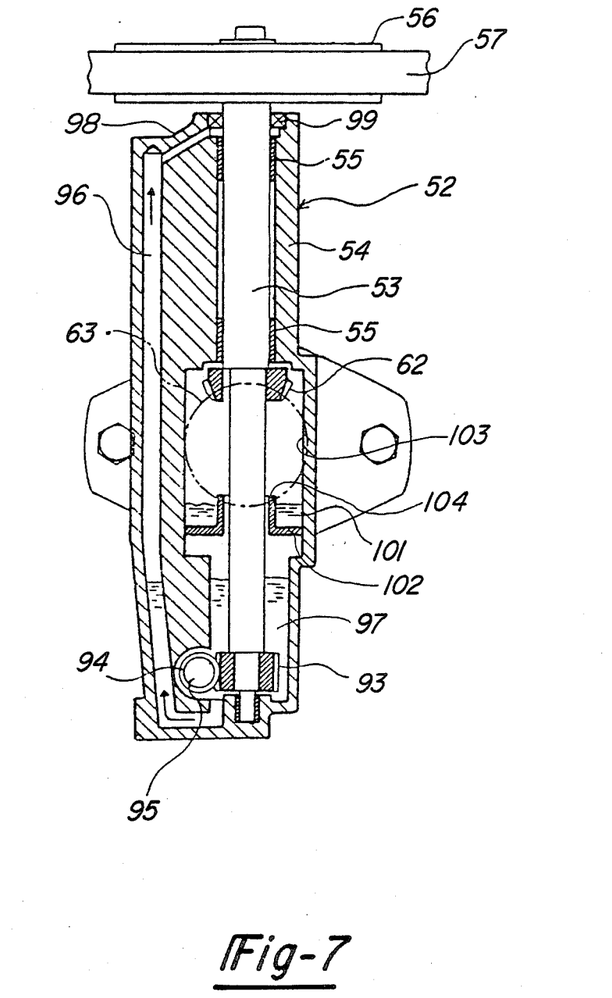
FIG. 7 is an enlarged cross-sectional view taken along the line 7—7 of FIG. 2.

A bevel gear 62 is affixed to the transfer drive shaft 53 adjacent its midpoint. The bevel gear 62 meshes with a bevel gear 63 which is, in turn, affixed to a fuel pump drive shaft 64.

Figure 5:
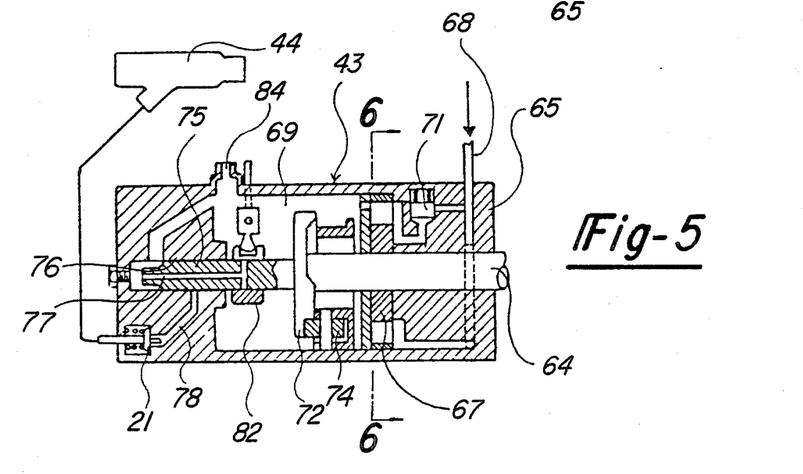
FIG. 5 is an enlarged cross-setional view of the fuel injection pump.

As may be seen in FIGS. 5 and 6, the fuel pump drive shaft 64 extends through an outer housing 65 of the fuel injection pump 43. The housing 65 is conveniently affixed to a flange formed on the outer housing 54 of the transfer drive 52. As may be best seen in FIG. 4, the cylinder block 25 is formed with a recess 66 between the adjacent cylinder bores 26 and the fuel injection pump housing 65 extends into this recess with the fuel injection pump drive shaft 64 rotating about a horizontally disposed axis. As a result, it is possible to maintain a very low configuration for the assembly.

A vane carrier 67 of a vane type pump is affixed to the fuel pump drive shaft 64 within pumping cavity formed at the end of the fuel injection pump housing 65 adjacent to the transfer drive 52. This high pressure pump receives fuel from a remotely positioned fuel tank (to be described) through a conduit 68 and discharges the high pressure fuel into a chamber 69 of the housing 65 which chamber is positioned adjacent the vane carrier 67. A pressure relief valve 71 is provided for limiting the maximum pressure existent in the chamber 69 and outputted by the high pressure pump.

Affixed for rotation with the shaft 64 but axially movable relative to it is a cam disk 72 which cooperates with a roller 74 for effecting reciprocation of the cam disk 72 and a piston 75 that is slidably supported within a bore 76 of the fuel injection pump housing 65. A delivery passage 77 extends through the piston 75 and has an outlet port (not shown) that communicates with delivery passages 78 that deliver high pressure fuel to a respective conduit 79 through a delivery valve 81. The conduits 79 extend to the respective fuel injection nozzles 44 for delivering a timed charge of fuel to the combustion chamber. A slidably supported spill ring 82 is controlled by the operator throttle for controlling the amount of fuel that is discharged in response to operator demand, as is well known in this art.

Conventional engines as operated with their output shafts rotating about a vertically extending axis, as with outboard motors, also employ fuel injection pumps where the drive shaft 64 rotates about a vertically extending axis rather than horizontally as in accordance with this invention. With a vertical arrangement, it should be readily apparent that any air in the system can be trapped in the bore 76 and would, accordingly, adversely affect the operation of the engine. In fact, if air becomes entrained in this area when the engine is shut down, it may be difficult if not impossible to restart the engine. Also, the delivery valves 81 are also at the top of the chamber under such conditions and they also can be entrapped with air.

However, in view of the horizontal placement of the fuel injection pump 43, these disadvantages are avoided. Furthermore, there is provided an air chamber 83 at the highest portion of the housing 65 in communication with the cavity 69. The air chamber 83 communicates with a vent fitting 84 which may be vented in any suitable manner preferably to the fuel tank (not shown).

Referring again to FIG. 7, it will be noted that the lubricant pump 47 is also driven by the transfer drive 52. To this end, there is provided a worm wheel 93 which is affixed to the lower end of the drive shaft 53 and which meshes with a worm 94 that is affixed to a lubricant pump drive shaft 95. The drive shaft 95 drives the lubricant pump 47 in a known manner. The drive ratios between the shaft 53 and the fuel injection pump shaft 64 is different from the drive ratio between the shaft 53 and the shaft 95 of the lubricant pump with the latter being lower so that the lubricant pump 47 runs slower than the full full injection pump 43. Of course, the ratios may be reversed as circumstances warrant.

An arrangement is incorporated for lubricating the shaft 53, bevel gears 62 and 63 of the transfer drive 52. This lubricating system includes a passage 96 that extends from a lubricant reservoir 97 formed at the lower end of the transfer drive housing 54 to a passage 98 which intersects the housing 52 and specifically the bore in which the shaft 53 is journaled above the uppermost bearing 55. An oil seal 99 is positioned above this point of intersection.

The configuration of the worm 94 is such that lubricant will be forced from the reservoir 97 up through the passage 96 and across the passage 98 in the direction shown by the arrows so as to lubricate the uppermost bearing 55. The lubricant can then travel downwardly along the shaft 53 by gravity to lubricate the bearing 55 and to fall on the backside of the bevel gear 62. The lubricant is then slung outwardly into a second lubricant reservoir 101 that is formed by a wall 102 that is pressed into a counterbore 103 of the housing 54. The wall 102 has an upper edge 104 that determines the upper end of the lubricant reservoir 101. It should be noted that this point is below the lower peripheral edge of the bevel gear 63 so that the bevel gear 63 will be partially submerged in the reservoir 101 and be lubricated by the lubricant therein. In addition, this lubricant will be carried to the gear 62 so as to lubricate it.

Figure 8:
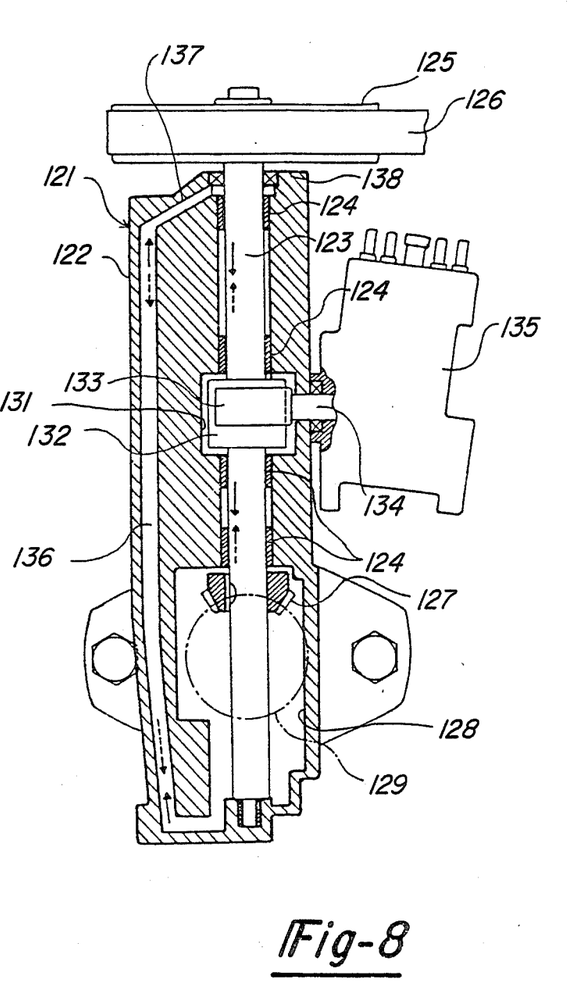
FIG. 8 is a cross-sectional view, in part similar to FIG. 7, showing another embodiment of the invention.

A transfer drive mechanism constructed in accordance with another embodiment of the invention is illustrated in FIG. 8 and is identified generally by the reference numeral 121. In many respects, the embodiment of FIG. 8 is similar to the embodiment of FIGS. 1 through 7 and specifically to the transfer drive unit 52 as shown in detail in FIG. 7. In this embodiment, however, the location of the drive shafts for the fuel injection pump and the lubricant pump are reversed.

Referring specifically to FIG. 8, the transfer drive unit 121 includes an outer housing 122 in which a drive shaft 123 is rotatably journaled by means of spaced apart bearings 124. The drive shaft 123 has a pulley 125 affixed to its upper end which is driven by a belt 126 which is, in turn, driven from the engine output shaft in the same manner as in FIGS. 1 through 7.

In this embodiment, a bevel gear 127 is affixed to the drive shaft 123 within a lower cavity 128 of the housing 122. The bevel gear 127 meshes with a bevel gear 129 that is affixed to the drive shaft of the fuel injection pump which is not shown and which may be considered to be the same as that of the embodiment of FIGS. 1 through 7.

Positioned above the cavity 128 and between a pair of the bearings 124, there is provided a further cavity 131 in which a worm wheel 132 is positioned. The worm wheel 132 is affixed for rotation with the drive shaft 123 and meshes with a worm 133. The worm 133 is affixed to a lubricant pump drive shaft 134 of a lubricant pump, indicated generally by the reference numeral 135 and which may operate in the manner as in the previously described embodiment.

In connection with this embodiment, a passage 136 extends through the housing 122 between the lower cavity 128 and an intersecting passage 137. The intersecting passage 137 intersects the bore in which the drive shaft 123 is rotatably journaled between the uppermost bearing 124 and an oil seal 138.

Lubricant contained within the cavity 131 is thrown by the rotation of the gears down through the bore through which the shaft 123 passes so as to lubricate the lowermost pair of bearings 124 and the bevel gears 127 and 129. This lubricant is then drawn upwardly from the cavity 128 through the passageway 136 and intersecting passageway 137 so as to lubricate the uppermost pair of bearings 124 and then flows back into the cavity 131. This direction of flow is indicated by the solid arrows in FIG. 8. If the shaft 123 rotates in the opposite direction, lubricant may be moved through the path indicated by the broken line arrows in the manner as aforedescribed.

Figure 9:
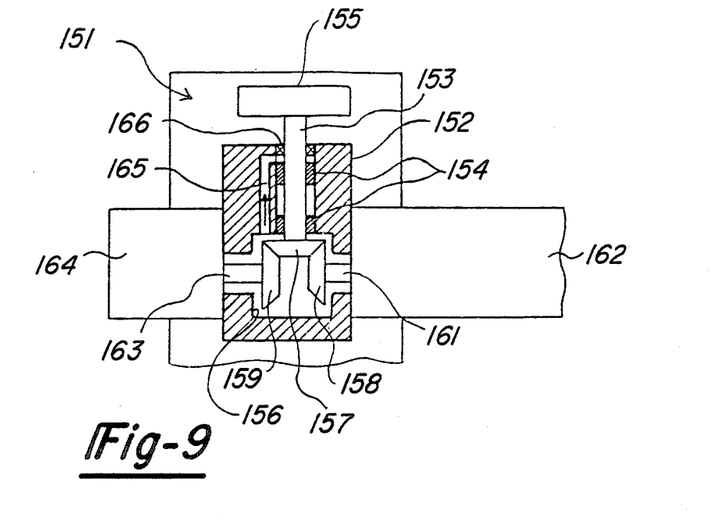
FIG. 9 is a cross-sectional view, in part similar to FIGS. 7 and 8, showing yet another embodiment of the invention.

A transfer drive and lubricating mechanism constructed in accordance with yet another embodiment of the invention is illustrated in FIG. 9 and is identified generally by the reference numeral 151. The previously described embodiments have employed worm gears for pressurizing the lubricant and moving it to the shaft supporting bearings. However, the same concept can be employed with bevel gears and FIG. 9 shows such an arrangement. In this embodiment, the transfer drive 151 includes an outer housing 152 in which a drive shaft 153 is supported by means of a pair of spaced bearings 154. The upper end of the drive shaft 153 carries a pulley 155 that is driven from the engine output shaft in the manner as previously described.

A cavity 156 is formed in the housing 152 and the drive shaft 153 terminates in the cavity 156. A bevel gear 157 is affixed to the drive shaft 153 in the cavity 156 and meshes with a pair of bevel gears 158 and 159. The bevel gear 158 is affixed to a fuel pump drive shaft 161 of a fuel injection pump 162. Like the previously described embodiments, the shaft 161 extends horizontally and the fuel injection pump 162 may be provided with an appropriate venting arrangement.

The bevel gear 159 is affixed to a lubricant pump drive shaft 163 of a lubricant pump, indicated at 164. The lubricant pump 164 may be of any known type.

The cavity 156 is adapted to contain a lubricant and has a vertically extending passage 165 that is disposed so as to receive lubricant thrown upwardly by the gear 159. This lubricant is then delivered through a transversely extending passage to an area between the uppermost bearing 154 and an upper oil seal 166. Hence, the bearings 154 will then be lubricated by this lubricant through gravity flow and the lubricant will also then return to the cavity 156 by gravity.

Figure 10:
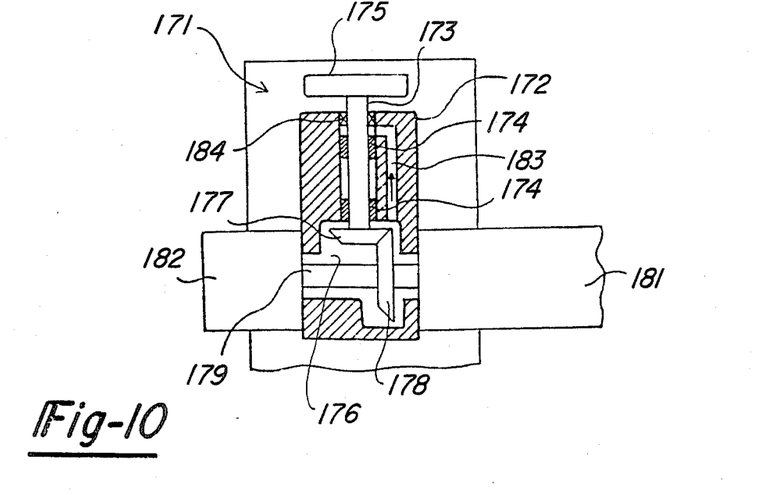
FIG. 10 is a cross-sectional view, in part similar to FIGS. 7, 8 and 9, showing a further embodiment of the invention.

The embodiment of FIG. 9 employs the use of two driven bevel gears and counter-rotating fuel injection and lubricant pumps. FIG. 10 shows another embodiment of the invention embodying bevel gears but pumps that operate in the same direction and employing only two rather than three bevel gears. A transfer drive constructed in accordance with this embodiment is indicated generally by the reference numeral 171 and includes an outer housing 172. A drive shaft 173 is journaled within the housing 172 by means of a pair of spaced apart bearings 174. The upper end of the shaft 173 carries a pulley 175 that is driven by the engine output shaft in the previously described manner.

The shaft 173 terminates within a cavity 176 and has a bevel gear 177 affixed to it. The gear 177 meshes with another bevel gear 178 contained within the cavity 176 and affixed to a shaft 179. The shaft 179 is coupled to the input shafts of a fuel injection pump 181 and lubricant pump 182 so as to drive these pumps in an obvious manner.

A vertically extending lubricant passage 183 is formed in the cm 1 housing 172 in proximity to the bevel gear 178. Lubricant is contained within the cavity 176 and will be thrown by the bevel gear 177 into the passage 183 so as to be forced upwardly. The lubricant then passes through a transversely extending passage to an area between an oil seal 184 and the uppermost bearing 174. As with the previously described embodiments, this lubricant will lubricate the bearings 174 and shaft 173 and return to the cavity 176 by gravity.

It should be readily apparent from the foregoing description that a number of embodiments of the invention have been illustrated and described. In each embodiment, a relatively simple yet highly effective arrangement is employed for lubricating the drive shaft of an externally positioned accessory of an internal combustion engine. Although a number of embodiments of the invention have been illustrated and described, various modifications may be made without departing from the spirit and scope of the invention, as defined by the appended claims.

We claim:

1. A lubricating arrangement for an externally positioned engine component driven from the crankshaft of an internal combustion engine, said crankshaft being journaled for rotation within a crankcase of said engine, said engine having a lubricating system for lubricating said crankshaft, said externally positioned engine component comprising a housing positioned externally of said engine crankcase, a shaft journaled within said housing, means for driving said shaft from said engine crankshaft, a first gear fixed for rotation with said shaft, a second gear meshing with said first gear for establishing a driving relationship between said second gear and said shaft, a cavity defined in said housing surrounding said gears and adapted to contain a lubricant, and a lubricant passsage having an inlet opening disposed to receive lubricant thrown by the rotation of one of said gears and directing said lubricant to said shaft for lubricating said shaft.

2. A lubricating arrangement as set forth in claim 1 wherein the lubricant passage further has a return portion extending from the shaft back to the cavity.

3. A lubricating arrangement as set forth in claim 1 wherein the shaft is supported by a pair of spaced apart bearings and the lubricant passage delivers lubricant to each of the bearings.

4. A lubricating arrangement as set forth in claim 3 wherein the lubricant passage further has a return portion extending from the shaft back to the cavity.

5. A lubricating arrangement as set forth in claim 1 wherein the gears are bevel gears.

6. A lubricating arrangement as set forth in claim 1 wherein the gears are worm gears.

7. A lubricating arrangement as set forth in claim 1 wherein the shaft rotates about a vertically extending axis and further including a third gear fixed for rotation with said shaft and spaced from the first gear, a fourth gear meshing with said third gear for establishing a driving relationship between said fourth gear and said shaft, a further cavity defined in said housing surrounding at least one of said third and fourth gears and adapted to contain a lubricant, the lubricant passage further passing through said further cavity for lubricating said third and fourth gears.

8. A lubricating arrangement as set forth in claim 7 wherein the first and second gears comprise worm gears.

9. A lubricating arrangement as set forth in claim 7 wherein the speed ratio between the first and second gears is different from the speed ratio between the third and fourth gears.

10. A lubricating arrangement as set forth in claim 9 wherein the first and second gears comprise worm gears.

11. A lubricating arrangement as set forth in claim 7 wherein the first and second gears are formed at the lower end of the housing.

12. A lubricating arrangement as set forth in claim 7 wherein the fourth gear drives the externally positioned engine component.

13. A lubricating arrangement as set forth in claim 12 wherein the engine component comprises a fuel injection pump.

14. A lubricating arrangement as set forth in claim 12 wherein the engine accessory comprises a lubrication pump.

* * * * *